UNITED STATES PATENT OFFICE.

ARNOLD STEINER, OF BASEL, SWITZERLAND.

MANUFACTURE OF DYES OF THE CERULEIN SERIES.

1,054,247.  Specification of Letters Patent. Patented Feb. 25, 1913.

No Drawing. Application filed July 23, 1912. Serial No. 711,031.

*To all whom it may concern:*

Be it known that I, ARNOLD STEINER, a citizen of Switzerland, and a resident of Basel, Switzerland, have invented certain new and useful Improvements in the Manufacture of Dyes of the Cerulein Series, of which the following is a specification.

It is known, as is evidenced by British Patent No. 14,220 of 1900, that amino-meta-oxybenzoylbenzoic acids substituted in the amino group give on condensation with pyrogallol or its derivatives coloring matters which dye chrome mordanted wool from blue to violet. I have found that these coloring matters can easily be converted into new products by treatment with dehydrating agents, as, for instance, concentrated sulfuric acid, whereby water is split off and the carboxyl group of the phthalic acid radical combines with the hydrogenatom in para position to the remaining hydroxyl group.

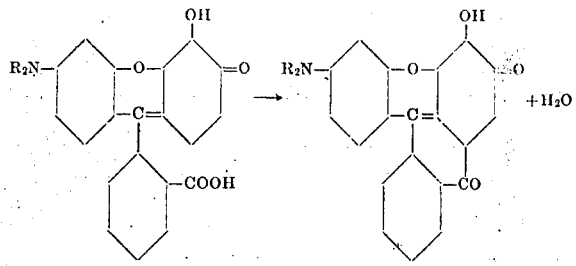

These new products dye mordanted wool and cotton in deep green to blue shades; they possess the excellent qualities of fastness of cerulein. Unlike cerulein, however, these new bodies are easily soluble in water and are, therefore, well adapted for calico printing. The chromium lake is of a dark green, very fast to light; the tannin lake is a dark blue.

According to British Patent No. 22,818 of 1907, similar colors have been produced by condensing amino-metaoxybenzoylbenzoic acids substituted in the amino group with oxyhydroquinone, and by subsequently splitting off $H_2O$. Oxyhydroquinone is not easily obtained and is not a cheap product. Furthermore, the unsulfonated colors as described in the patent are not very soluble and are less fit for calico printing than those obtained by the present process.

My invention may be carried out by the processes set forth in the following examples, it being understood, however, that various other methods may be successfully pursued and that the examples are to be regarded as illustrative merely.

Example I: 1 part of the phthalein coloring matter obtained by condensation of diethylamino-meta-oxybenzoylbenzoic acid with pyrogallol is dissolved in 10 parts of sulfuric acid of 96% strength; the solution is heated slowly to 155°–160° C. and this temperature is maintained during 5–6 hours, until a test gives a blue solution in water, and when salted out gives a very weak, slightly yellowish red filtration. The sulfuric acid solution, which at the beginning was a deep red, is now of a yellowish brown color. The mass is now poured into a relatively large amount of water and becomes completely dissolved therein. By salting out, the hydrochlorid is obtained as a dark, crystalline precipitate. By redissolving and again salting out, the color is obtained pure. In this example, sulfuric acid of greater strength than that mentioned may be used; when, for example, weakly fuming acid is used the condensation takes place more quickly and at a lower temperature.

Example II: Mix together 31 kilograms of diethylamino-meta-oxybenzoylbenzoic acid and 13 kilograms of pyrogallol, and then add 35 kilograms of sulfuric acid of 75% strength and heat on a water bath. The mass very soon becomes liquid and acquires a metallic luster, and after heating for 7–8 hours it becomes crystalline. Add slowly 300 kilograms of fuming sulfuric acid containing 10–12% $SO_3$, and heat during about three hours to 150–155° C. until the red coloration has disappeared and a test dissolves in water with a blue color. The salting out, etc., is done as in Example I.

The color obtained by carrying out the processes of the above examples is a dark violet powder, easily soluble in water with a blue coloration; on the addition of soda or soda lye the color base is precipitated as a dark green mass. In concentrated sulfuric acid it dissolves with a yellowish brown tint; on diluting with water a pure blue solution is obtained.

If instead of the coloring matter from diethylamino-meta-oxybenzoylbenzoic acid and pyrogallol, the corresponding product from the dimethylamino-meta-oxybenzoylbenzoic acid is used, a readily soluble green coloring matter is obtained which gives a dark green chrome lake of excellent fastness.

I claim:

1. The process of making coloring matters, which consists in treating with a dehydrating agent the product formed by condensing amino-meta-oxybenzoylbenzoic acid substituted in the amino group with pyrogallol.

2. The process of making coloring matters, which consists in treating with a dehydrating agent the product formed by condensing diethylamino-meta-oxybenzoylbenzoic acid with pyrogallol.

3. The process of making coloring matters, which consists in treating with sulfuric acid the product formed by condensing amino-meta-oxybenzoylbenzoic acid substituted in the amino group with pyrogallol.

4. The process of making coloring matters, which consists in treating with sulfuric acid the product formed by condensing diethylamino-meta-oxybenzoylbenzoic acid with pyrogallol.

5. The process of making coloring matters, which consists in treating with sulfuric acid the product formed by condensing diethylamino-meta-oxybenzoylbenzoic acid with pyrogallol, and heating until a test portion gives a blue solution in water, and then dissolving the mass in water and finally salting out.

6. As new products, the herein described coloring matters obtainable by condensing amino-meta-oxybenzoylbenzoic acid substituted in the amino group with pyrogallol, then treating the product thus formed with a dehydrating agent and heating until a test portion shows the condensation to be complete, then dissolving the mass in water and finally salting out, said coloring matters being readily soluble in water and readily soluble in concentrated sulfuric acid with a yellowish brown tint which is changed to blue upon dilution with water, and yielding a dark green precipitate upon addition to the water solution thereof of soda.

7. As new products, the herein described coloring matters obtainable by condensing diethylamino-meta-oxybenzoylbenzoic acid with pyrogallol, then treating the product thus formed with sulfuric acid and heating until a test portion gives a blue solution in water and when salted out gives a very weak, slightly yellowish-red filtration, then dissolving the mass in water and finally salting out, said coloring matters being in the form of a dark violet powder, easily soluble in water with a blue coloration, soluble in concentrated sulfuric acid with a yellowish brown tint which is changed to blue upon dilution with water, and yielding a dark green precipitate upon addition to the water solution thereof of soda.

In testimony whereof, I have hereunto set my hand, in the presence of two subscribing witnesses.

ARNOLD STEINER.

Witnesses:
  MELCHIOR BÖNIGER,
  GEORGE H. WAGNER.